(12) United States Patent
Yalovsky et al.

(10) Patent No.: US 7,480,861 B2
(45) Date of Patent: Jan. 20, 2009

(54) SYSTEM AND METHOD FOR CONVERTING BETWEEN TEXT FORMAT AND OUTLINE FORMAT

(75) Inventors: Mark Yalovsky, Seattle, WA (US); Stuart Jay Stuple, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 10/268,151

(22) Filed: Oct. 9, 2002

(65) Prior Publication Data

US 2004/0073872 A1   Apr. 15, 2004

(51) Int. Cl.
   G06F 17/00   (2006.01)
   G06F 17/20   (2006.01)

(52) U.S. Cl. .................... 715/255; 715/243

(58) Field of Classification Search ............... 715/530, 715/517, 243, 255
   See application file for complete search history.

(56) References Cited

U.S. PATENT DOCUMENTS

| | | | | |
|---|---|---|---|---|
| 4,495,490 A | | 1/1985 | Hopper et al. ............... 340/709 |
| 5,359,708 A | * | 10/1994 | Bloomer et al. ............. 715/524 |
| 5,530,794 A | * | 6/1996 | Luebbert ..................... 715/524 |
| 5,621,875 A | * | 4/1997 | Mason et al. ................ 715/531 |
| 5,694,610 A | * | 12/1997 | Habib et al. ................. 715/531 |
| 5,900,004 A | * | 5/1999 | Gipson ......................... 715/530 |
| 5,978,818 A | * | 11/1999 | Lin ............................ 715/501.1 |
| 6,026,233 A | * | 2/2000 | Shulman et al. ............. 717/113 |
| 6,026,417 A | * | 2/2000 | Ross et al. ................... 715/517 |
| RE36,704 E | * | 5/2000 | Parker et al. ................ 715/542 |
| 6,112,216 A | * | 8/2000 | Pratley et al. ............... 715/509 |
| 6,177,939 B1 | * | 1/2001 | Blish et al. .................. 715/770 |
| 6,309,305 B1 | * | 10/2001 | Kraft ........................... 455/566 |
| 6,535,930 B2 | * | 3/2003 | Stern et al. .................. 719/329 |
| 6,643,652 B2 | * | 11/2003 | Helgeson et al. ............. 707/10 |
| 6,735,347 B1 | * | 5/2004 | Bates et al. .................. 382/282 |
| 6,757,870 B1 | | 6/2004 | Stinger ........................ 715/513 |
| 6,877,138 B2 | * | 4/2005 | Fitzpatrick et al. .......... 715/769 |
| 2002/0095658 A1 | * | 7/2002 | Shulman et al. ............. 717/111 |
| 2003/0007013 A1 | * | 1/2003 | Gatis ............................ 345/853 |
| 2003/0056179 A1 | * | 3/2003 | Mori ............................. 715/530 |
| 2003/0182388 A1 | * | 9/2003 | Alexander et al. .......... 709/213 |

OTHER PUBLICATIONS

Girgensohn, Andreas, "Supporting the Writing of Reports in a Hierarchical Organization", WACC '99, San Francisco, CA, Feb. 1999, pp. 147-156.*

Rubin, Charles, Running Microsoft Word 2000, Microsoft Press, Redmond, WA, © 1999, pp. 64-70 and 870-871.*

Microsoft Word (Version 6.0) User's Guide, Microsoft Corp., Redmond, WA, Document No. WB57923-0394, © 1994, pp. 43-45.*

(Continued)

Primary Examiner—John E Breene
Assistant Examiner—Robert Stevens
(74) Attorney, Agent, or Firm—Timothy P. Sullivan; Merchant & Gould, PC

(57) ABSTRACT

Described is a mechanism for pasting data from a source document into a destination document while providing the user with options related to the particular data being pasted. The options allow the user to choose how much formatting or structure to persist. More specifically, the user may select whether to persist general formatting, direct formatting, and/or outline structure through the paste operation.

27 Claims, 8 Drawing Sheets

Match Destination Formatting

OTHER PUBLICATIONS

Bott, Ed, et al., Special Edition Using Microsoft Office XP, Que Corp., Indianapolis, IN, May 2001, pp. 132-139.*
Tamura, Randall A., et al., Lotus Notes 4 Unleashed, Sam's Publishing, Indianapolis, IN, © 1996, p. 110.*
Kraynak, Joe, The Complete Idiot's Guide To Microsoft Office 2000, Que Corp., Indianapolis, IN, Mar. 1999, pp. 241-245.*
Eddy, Sandra E., The Compact Guide To Lotus SmartSuite, Sybex Inc., Alameda, CA, © 1994, pp. 184-185 and 642.*
Rubin, Charles, Running Microsoft Word 2000, Microsoft Press, Redmond, WA, © 1999, pp. 64-70, 86, 869-871 and 879.*
Helene Richy; "A Hypertext Electronic Index based on the Structured Document Editor Grif"; Electronic Publishing, vol. 7('), Mar. 1, 1994; pp. 1-14.
Kees van der Laan; "Working Group 1: Education: Review Michael Urban's *An Introduction to LATEX*"; Feb. 1992; pp. 23-24.

* cited by examiner

Fig. 3  *Keep Source Formatting*

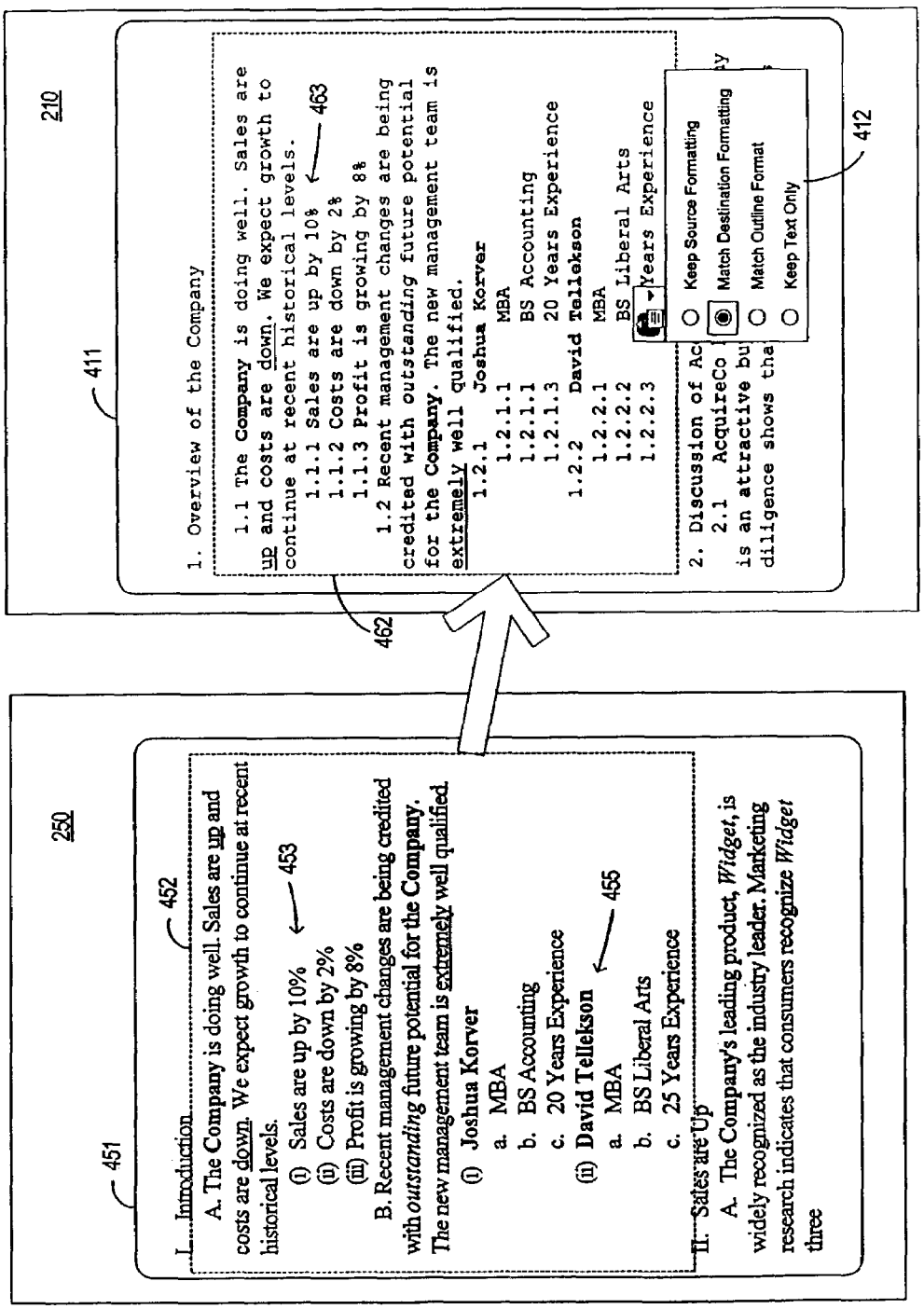
Fig. 4 — Match Destination Formatting

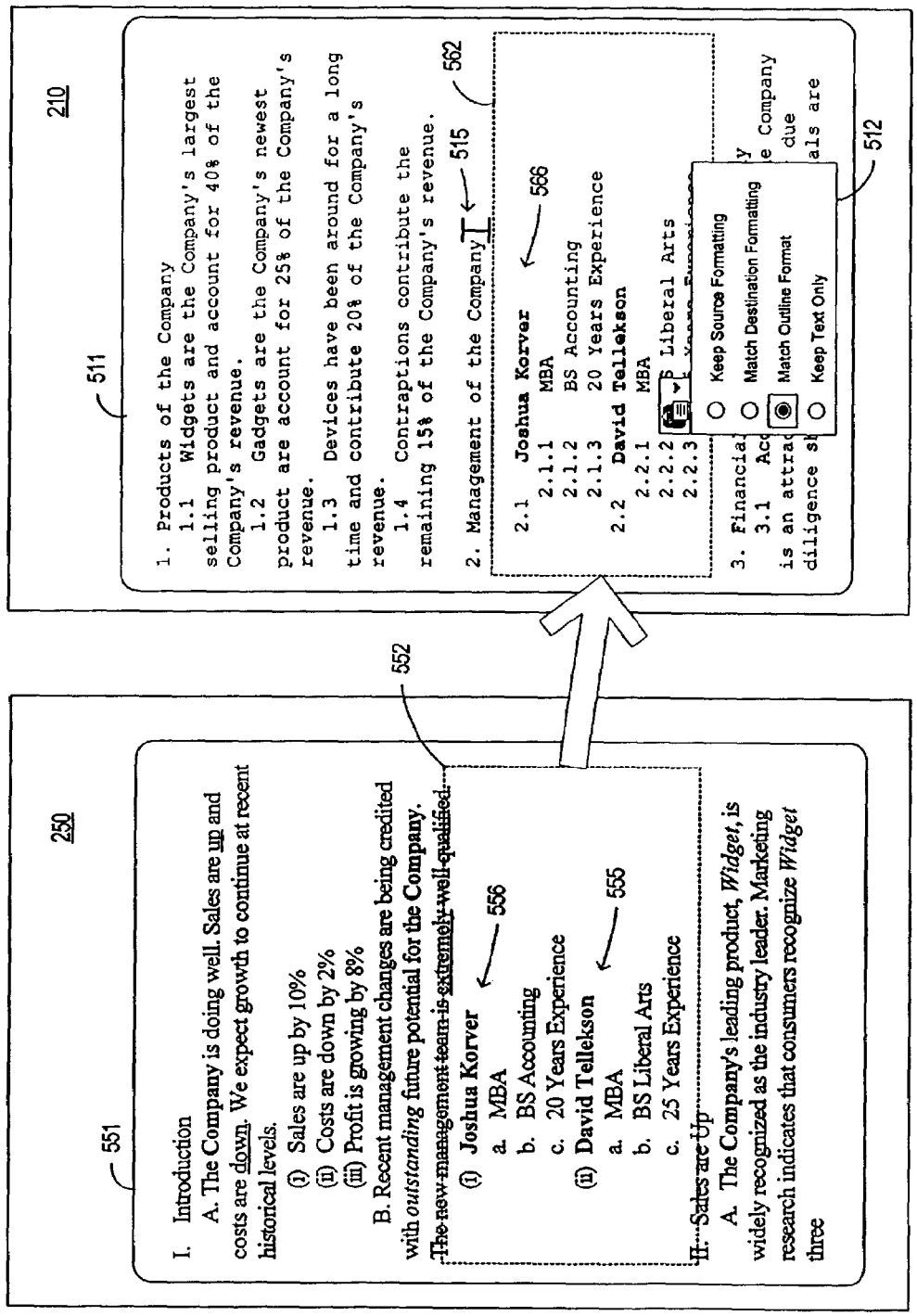
Fig. 5   *Match Outline Format*

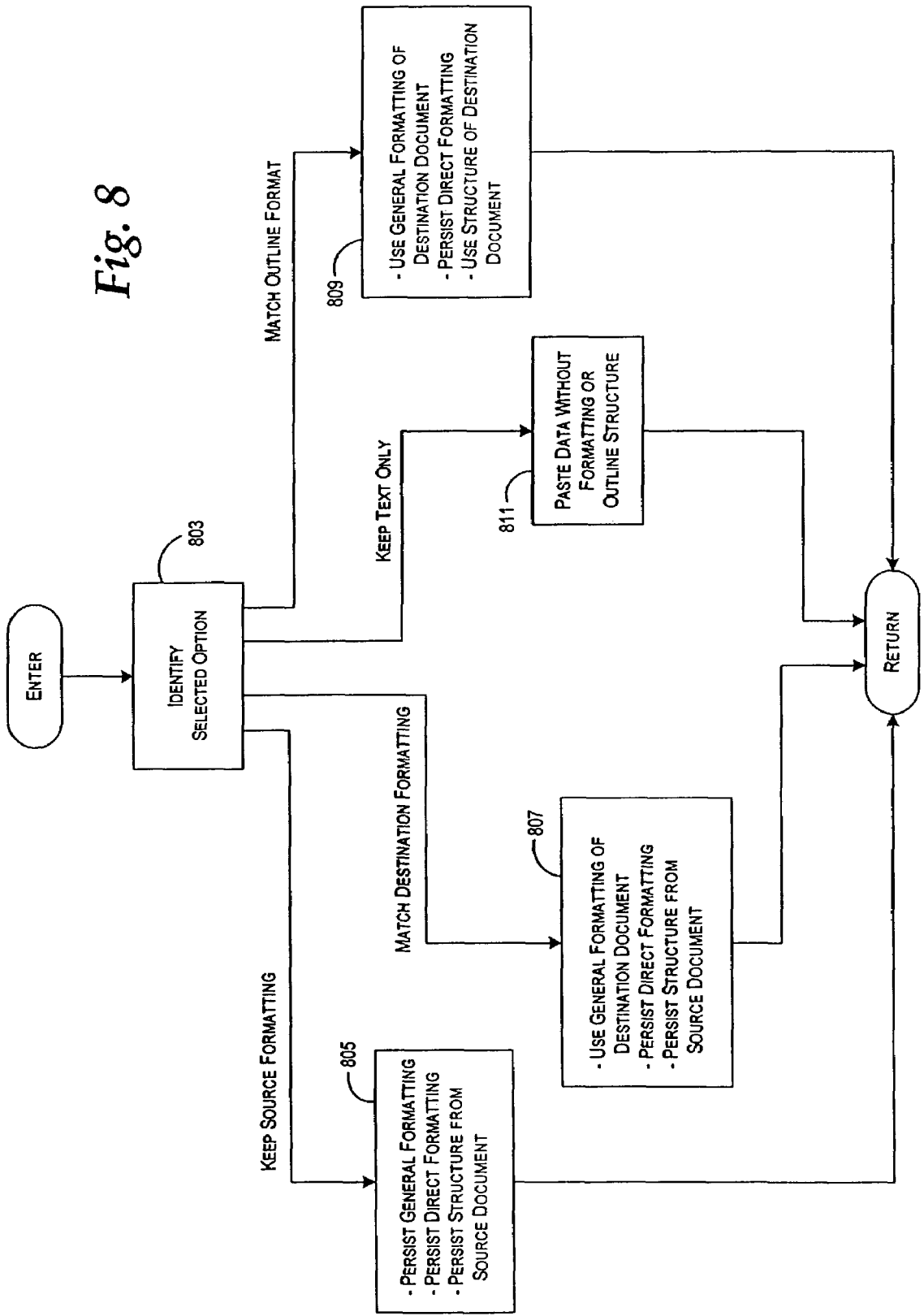

SYSTEM AND METHOD FOR CONVERTING BETWEEN TEXT FORMAT AND OUTLINE FORMAT

BACKGROUND OF THE INVENTION

Computing systems have achieved widespread acceptance as a means for creating and manipulating a wide variety of types of documents. For instance, users routinely create word processing documents, drawing documents, spreadsheet documents, database documents, and the like. Even among word processing documents there may be various types. For instance, some word processing applications may be designed to provide rich formatting and page layout functionality, such as a desktop publishing application. Other word processing applications may be designed as simple text editors. Still other word processors may be designed as tools for organizing textual data or notes into useful information.

One of the problems facing many software designers is the consumer's desire to share information between applications. In particular, the amount of metadata that may apply to portions of a document is enormous. For instance, in a modem word processing application, a portion of data may include general formatting that defines aspects of the appearance of the data. Examples of such general formatting may include paragraph indentation, font typeface, font size, and the like. In addition, many of those aspects of the appearance of data in a document may be directly modified on only a particular portion of the document. For example, a few words in a paragraph may be bolded or underlined for emphasis, or a particular paragraph may be indented differently than other paragraphs in a selection. To further complicate matters, text within a document may also have outline structure. For the purpose of this document, outline structure means that two or more elements of a document are assigned levels that distinguish one element from another element. Parent/child relationships may also be created between elements of different levels.

Until now, software designers have not provided the user with the ability to identify exactly what aspects of data are persisted when data is copied from one document to another document. Existing applications provide users with few options regarding pasted data. For instance, a user may choose to paste data as text only, which eliminates all vestiges of formatting or outline structure. Alternatively, some existing applications provide a user with a choice of the particular general format to use when pasting data. For example, some applications allow data to be pasted as HyperText Markup Language (HTML) or Rich Text Format (RTF). However, pasting data using a generalized intermediate format forces the user to accept whatever aspects of the data that exist in the source document and are supported by the intermediate format. In addition, a mechanism for deriving outline structure from non-outline formatting has, until now, eluded those skilled in the art.

SUMMARY OF THE INVENTION

The present invention is directed at a mechanism for pasting data from a source document into a destination document while providing the user with options related to the particular data being pasted. The options allow the user to choose how much formatting or structure to persist. More specifically, the user may select whether to persist general formatting, direct formatting, and/or outline structure through the paste operation.

In one aspect, a paste operation results in a prompt to select from one of a plurality of pasting options. Each option is associated with a different set of formatting and/or structure features to persist. For instance, one option may be associated with persisting both general formatting and direct formatting, and for persisting structure. Another option may be associated with persisting only direct formatting and some aspects of structure (e.g., only relative levels). Still another option may be associated with persisting only direct formatting and other aspects of structure (e.g., absolute levels). Still another option may be associated with not persisting either formatting or structure.

These and other aspects of the invention are described in detail below in conjunction with some illustrative embodiments of the invention.

BRIEF DESCRIPTION OF THE DRAWINGS

FIG. 3 is a graphical representation of one implementation of the invention for applying one option to selected data pasted in a destination document, the selected option defining a level of formatting and/or structure to persist through the pasting operation.

FIG. 4 is a graphical representation of another implementation of the invention for applying another option to selected data pasted in a destination document, the selected option defining a level of formatting and/or structure to persist through the pasting operation.

FIG. 5 is a graphical representation of yet another implementation of the invention for applying yet another option to selected data pasted in a destination document, the selected option defining a level of formatting and/or structure to persist through the pasting operation.

FIG. 8 is a logical flow diagram illustrating in greater detail a process for applying one of a plurality of options to pasted data to persist a desired amount of formatting and/or structure, in accordance with one implementation of the invention.

DETAILED DESCRIPTION OF THE PREFERRED EMBODIMENT

The invention provides a mechanism for pasting data from a source document into a destination document while providing the user with options related to the particular data being pasted. The options allow the user to choose how much formatting or structure to persist. More specifically, the user may select whether to persist general formatting, direct formatting, and/or outline structure through the paste operation. Embodiments of the invention, as well as certain illustrative options that may be employed, are explained in detail here.

Figure 1:
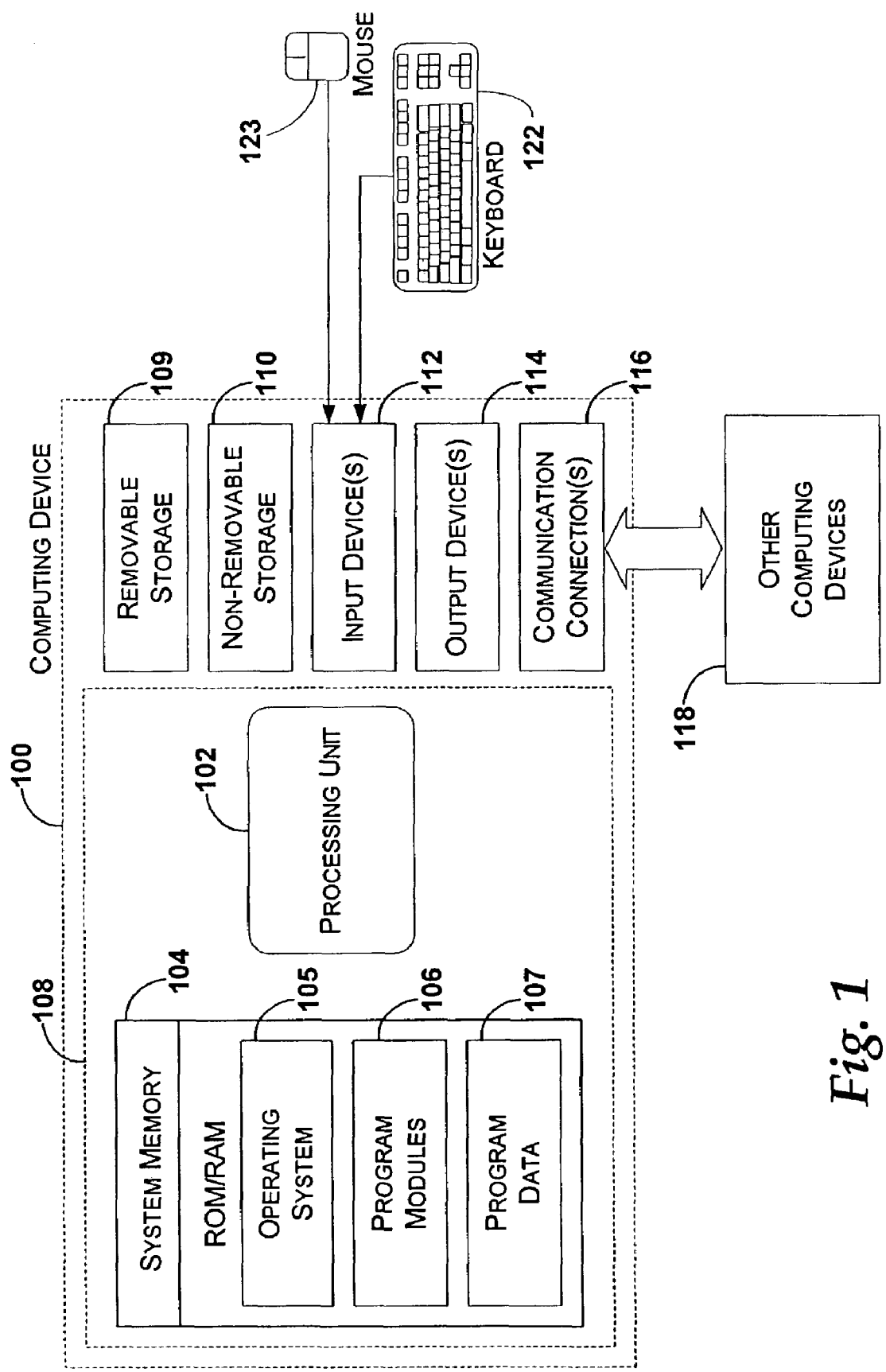
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
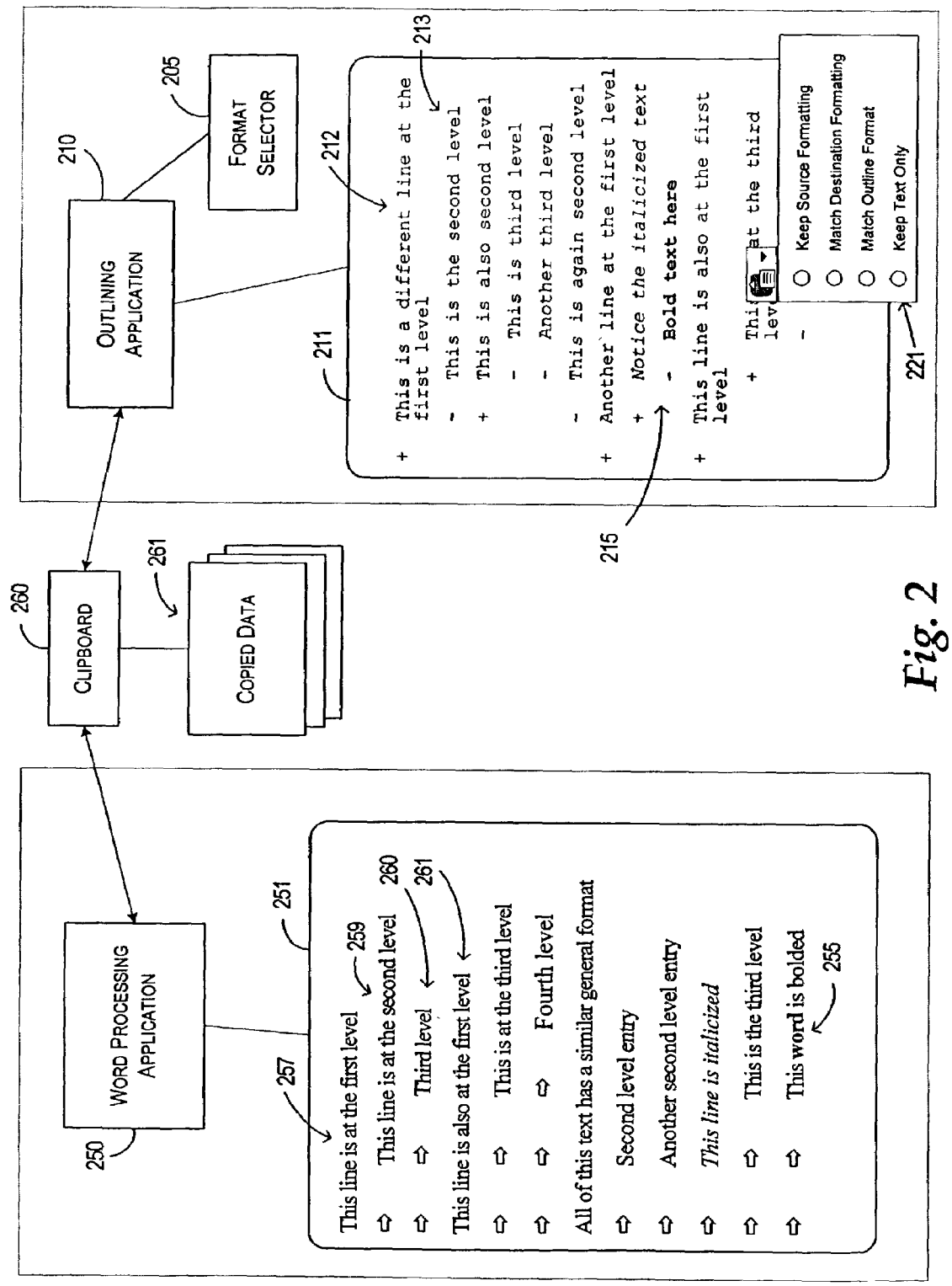
FIG. 2 is a functional block diagram generally illustrating components of a system implementing the present invention.

FIG. 2 is a functional block diagram generally illustrating components of a system implementing the present invention. Illustrated are two applications, an outlining application 210 and a word processing application 250. The word processing application 250 may be any software application capable of creating, editing, or manipulating electronic data such as text. The word processing application 250 may also include web-browsing capability of the type used for viewing markup-based (e.g., HyperText Markup Language or extensible Markup Language) pages or the like.

Using the word processing application 250, users can create and edit documents, such as a source document 251, including, in this example, many paragraphs or lines of text. Common among word processing applications is the ability to apply formatting to the data within the source document 251. Some formatting is applied widely to much of the content of the source document 251. This type of formatting will be referred to as general formatting. Examples of such general formatting may include margins, paragraph indentation, font typeface, font size, and the like. For instance, the font typeface of the text within the source document 251 is mostly a standard "Roman" style typeface, such as the text on line 259. In addition, most of the text appears left justified with a common margin, but certain paragraphs or lines appear indented. The indentation may be the result of general formatting or, as will be discussed momentarily, the product of outline structure.

The word processing application 250 also allows the user to apply direct formatting that overrides the general formatting. For instance, some of the text of the source document 251 has been modified from the default typeface. In particular, all the text of line 265 has been italicized, and a single word 255 on another line has been bolded. Direct formatting commonly refers to deviations from the general formatting that have been applied on a case-by-case basis, typically by the user. Direct formatting is commonly believed to be more meaningful to the final product than general formatting because direct formatting is applied in an active step, while general formatting commonly occurs in a passive manner, such as by default.

The word processing application 250 also includes the capability to apply outline structure to the source document 251. As described above, outline structure means that two or more elements of a document are assigned levels that distinguish one element from another element using a parent/child relationship. For example, referring to the content of the source document 251, the first line 257 of the document is at a first level. The second line 259 of the document is at a second level. The second line 259 is illustrated indented slightly from the left margin of the source document 251. This is a feature commonly applied to elements having outline structure, but the indentation is not a part of the outline structure. Rather, the structure allows discrete portions or elements (e.g., lines or paragraphs) of the document to be assigned to a particular level. Then the elements of that level may be manipulated (e.g., reformatted) in like fashion and at the same time.

Another important feature of outline structure is the parent/child relationships that are created. Typically, the content of the document is described in a hierarchical manner, with nodes of higher level (numerically lower) having children at a lower level. In the document, typically, elements of text at a given level are considered children of the immediately preceding element at a higher level. For instance, referring to the source document 251, the first line 257 exists at a first level. The first line 257 is the immediately preceding element of a higher level than the second line 259. Thus, the second line 259 is the child of the first line 257. Likewise, the second line 259 is the immediately preceding element of a higher level than the third line 260. Thus, the hird line 260 is the child of the second line 259. The fourth line 261 is at the same level as the first line 257, so the fourth line 261 is not a child of the first line 257. Rather, the fourth line 261 is considered a sibling of the first line 257.

The outlining application 210 may be the same type of application as the word processing application 250, or it may be another type of application that includes many of the features of the word processing application 250. More specifically, the outlining application 210 also maintains documents, such as destination document 211, including data (e.g., text) that may have general or direct formatting, and may have outline structure. For instance, the default font typeface for the destination document 211 is a Courier type font (general formatting). Other text 215 may be italicized or bolded (direct formatting). The first line 212 of the destination document 211 is at a first level, and the second line 213 is at a second level. It is envisioned that the outlining application 210 and the word processing application 250 include much of the same functionality, but they also may not. However, the word processing application 250 and the outlining application 210 are similar enough that data may be shared between the two.

A clipboard component 260 is a software component that enables data to be shared between two or more applications executing on a computing system. For instance, all or a portion of the content of the source document 251 may be "copied" or "cut" from the source document 251 by the word processing application 250. This operation causes one or more representations of that portion of the information to be passed to the clipboard component 260 by the word processing application 250. The clipboard component 260 then makes that information available for insertion (or "pasting") into any other application on the computing system.

The clipboard component 260 may make the information available in one or more different formats of copied data 261. Typically, the formats that are made available are only those that are supported by the application making the copied data 261 available. For example, if the information is copied from a Web browser, the clipboard component 260 may make the information available in both markup format or plain text format. In that way, when pasted into another application, the copied data can maintain whatever formatting has been applied to it, or that formatting can be cast off when the data is pasted. However, the clipboard component 260 does not make available any options about particularly what formatting may be kept and what formatting may be discarded. Essentially, the interpretation of the pasted content is the responsibility of the destination application.

The format selector 205 is a component that interacts with the outlining application 210 to provide options about data received from the clipboard component 260. In accordance with the invention, if data is pasted to the outlining application 210, the format selector 205 presents an on-object-user-interface (OOUI) 221 that includes several options for exactly what formatting or structure or both will be persisted through the pasting operation. In other words, the user is presented with options that provide control over what formatting and outline structure from the source document 251 are carried over. Based on the user's selection, the format selector 205 interacts with the outlining application 210 to determine what modifications, if any, should be made to the copied data 261 to satisfy the selected option. The format selector 205 then applies those modifications to the copied data 261 as it is pasted into the destination document 211. As illustrated on the OOUI 221, the format selector 205 may provide options to keep the source formatting, match the destination formatting, match the outline format, or keep the text only. FIGS. 3-6 illustrate these various options that may be applied. Of course, other options will become apparent to those skilled in the art from the present teachings.

Figure 3:
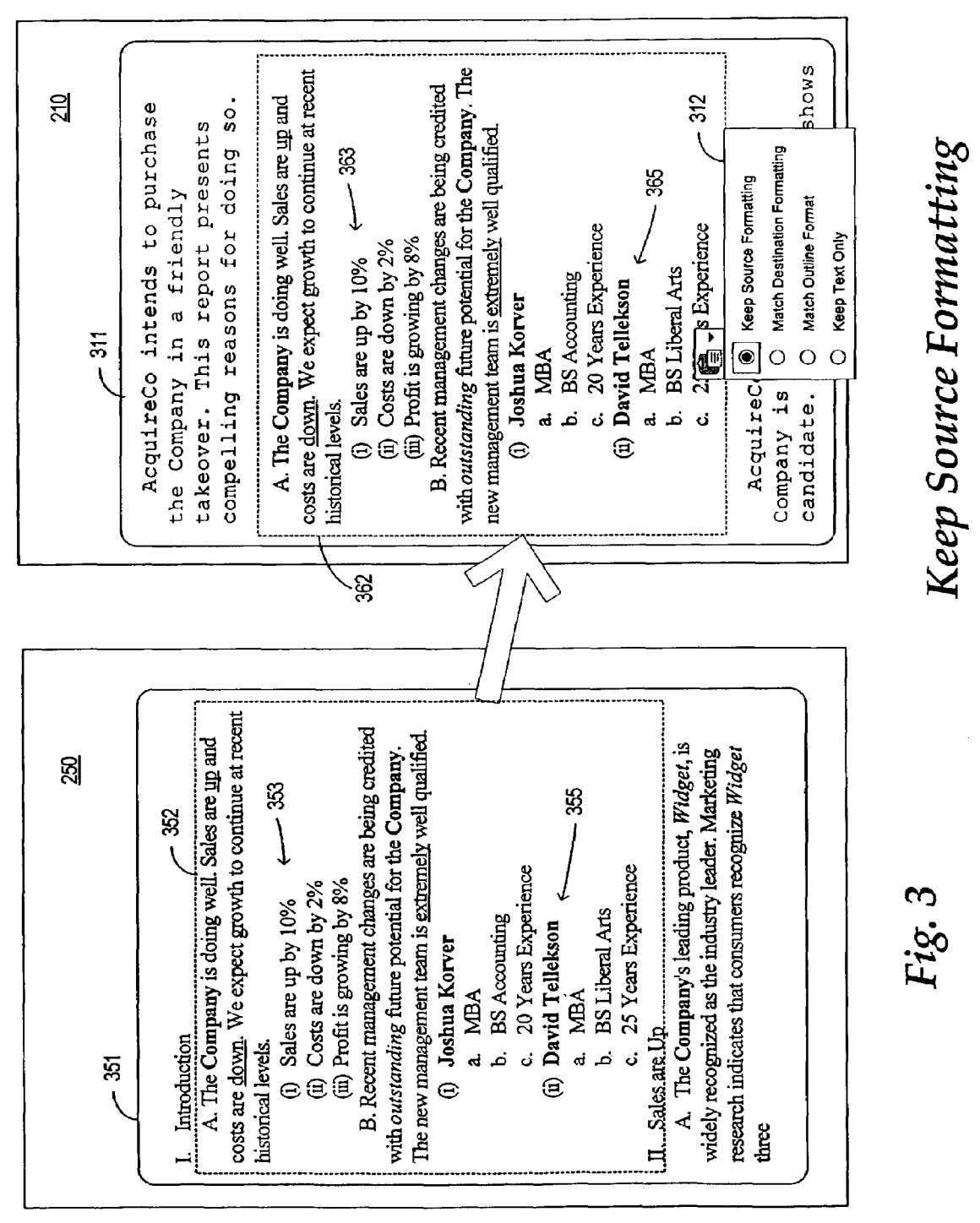

FIG. 3 is a graphical illustration of one option, keep source formatting, that may be applied to a selection 352 of data that is copied from a source document 351 and pasted into a destination document 311. In this scenario, the selection 352 includes outline structure, general formatting, and direct formatting. For example, the text "Sales are up by 10%" 353 is shown in a Roman type font (general formatting), and at a third level in an outline structure (I.A (i)). In addition, the text "David Tellekson" 355 is shown in the same font but bolded (direct formatting). Other examples are also evident in the illustration.

Pasting the selection 362 into the destination document 311 caused an OOUI 312 to be displayed in the destination document 351 proximate to the location where the selection 362 has been inserted. In this example, the OOUI 312 presents the user with four options for how the selection 362 should be pasted. The user, in this example, has chosen to keep the source formatting, as evidenced by the selected radio button next to that option. In response, the format selector 205, in cooperation with the outlining application 210 inserts the selection exactly as it appeared in the source document 351 at the time of selection. More specifically, both general and direct formatting from the destination document 311 are maintained. In addition, the levels of the elements in the selection 352 are maintained, and the scheme of numbering or bulleting the levels is maintained.

For instance, in the destination document 311, the text "Sales are up by 10%" 363 is still shown in a Roman type font (general formatting), and at a third level in the outline structure (I.A (i)). In addition, the text "David Tellekson" 365 is still bolded (direct formatting). It should be appreciated that the levels of each element of the selection 362 remain at the same absolute and relative levels as they were in the source document 351. Note also that the typeface of the text in the selection 362 is the same as it was in the source document 351, but different than the existing text (Courier type) in the destination document 311.

FIG. 4 is a graphical illustration of another option, keep destination formatting, that may be applied to a selection 452 of data that is pasted into a destination document 411. In this scenario, the selection 452 includes outline structure, general formatting, and direct formatting. For instance, the text "Sales are up by 10%" 453 is again shown in a Roman type font (general formatting), and at a third level in an outline structure (I.A (i)). In addition, the text "David Tellekson" 455 is shown in the same font but bolded (direct formatting). Other examples are also evident in the illustration.

Pasting the selection 462 into the destination document 411 again caused the OOUI 412 to be displayed. However, in this scenario, the user has chosen to match the destination formatting, as evidenced by the selected radio button next to that option. In response, the format selector 205, in cooperation with the outlining application 210 inserts the selection in the destination document 462 but with certain modifications. More specifically, the direct formatting from the destination document 411 is maintained, but general formatting is not. Rather, the general formatting of the destination document 411 is applied to the selection 462. It should be noted that the application (the outline application 210 in this example) decides what formatting is general and what formatting is direct. The levels of the elements in the selection 452 are maintained, but the scheme of numbering or bulleting the levels used by the destination document 411 is used.

By way of illustration, the text of the selection 462 (e.g., "Sales are up by 10%" 463) in the destination document 411 is no longer shown in a Roman type font (general formatting), but rather in the native font of the destination document 411

(Courier type). However, the direct formatting has been persisted (e.g., the text "David Tellekson" 465 is still bolded). In this case, the levels of each element of the selection 462 remain at the same absolute and relative levels as they were in the source document 451. For instance, the text "Sales are up by 10%" 463 is still at a third level in the outline structure (1.1.1). However, the scheme of numbering the elements in the selection 462 has been changed from that used in the source document 451 (i.e., I.A (i)) to that used in the destination document 411 (i.e., 1.1.1), but different than the existing text (Courier type) in the destination document 311.

FIG. 5 is a graphical illustration of yet another option, match outline format, that may be applied to a selection 552 of data pasted into a destination document 511. In this scenario, the selection 552 includes outline structure, general formatting, and direct formatting. For instance, all the text of the selection 552 is shown in a Roman type font (general formatting), but some text, such as the text "David Tellekson" 555, is shown in bold font (direct formatting). Note also that the text "Joshua Korver" 556 and the text "David Tellekson" 555 are both at the third level of the source document 551 (i.e., I.B (i) and I.B (ii) respectively).

Pasting the selection 562 into the destination document 511 again caused the OOUI 512 to be displayed. However, in this scenario, the user has chosen to match the outline format, as evidenced by the selected radio button next to that option. In response, the format selector 205, in cooperation with the outlining application 210 inserts the selection in the destination document 562 but with certain modifications in addition to those described above. More specifically, the direct formatting from the destination document 511 is maintained, but general formatting is not. Rather, the general formatting of the destination document 511 is applied to the selection 562. In addition, the level applicable at the insertion point where the selection 562 is pasted is applied to the highest level in the selection 562. The relative levels of other elements of the selection 562 are adjusted in accordance with the new highest level. Also, the scheme of numbering or bulleting the levels used by the destination document 511 is used.

By way of illustration, the text of the selection 562 (e.g., "Joshua Korver" 566) is no longer shown in a Roman type font (general formatting), but rather in the native font of the destination document 511 (Courier type). Again, the direct formatting has been persisted (e.g., the text "Joshua Korver" 566 is still bolded). Unlike the previous example, the levels of each element of the selection 562 have been changed such that the highest level of the selection (e.g., the text "Joshua Korver" 566) has been changed to the level at the insertion point 515 where the selection 562 was pasted (level 2 in this example). The relative levels of the other elements in the selection 562 remain the same with respect to the new highest level. For instance, the text "Joshua Korver" 556 was at a third level in the source document 551 (i.e., I.B (i)). However, the text "Joshua Korver" 566 is inserted in the destination document 511 at the second level (i.e., 2.1) Similarly, the scheme of numbering the elements in the selection 562 has been changed from that used in the source document 551 (i.e., I.A (i)) to that used in the destination document 511 (i.e., 1.1.1).

Figure 6:
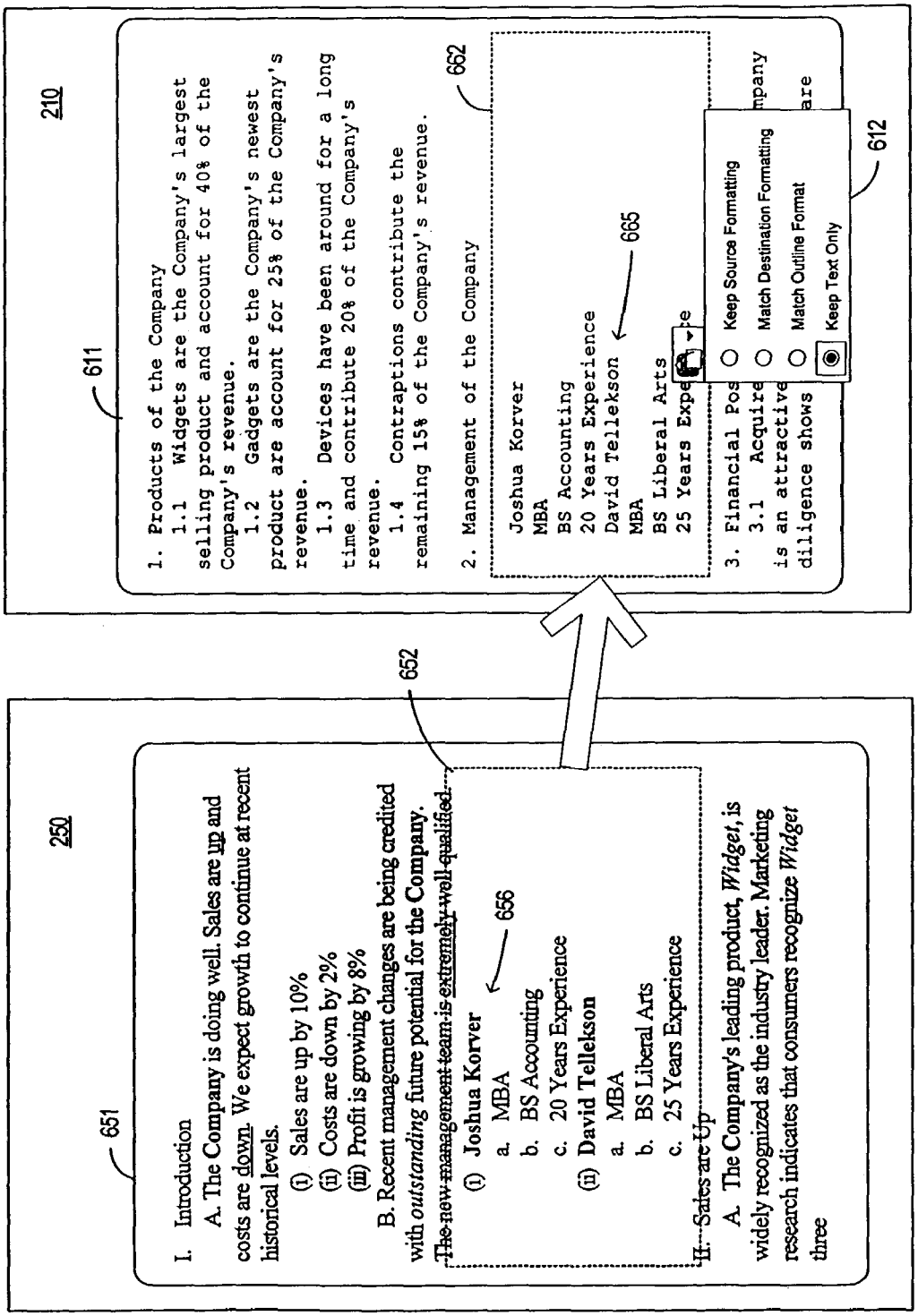
FIG. 6 is a graphical representation of still another implementation of the invention for applying still another option to selected data pasted in a destination document, the selected option defining a level of formatting and/or structure to persist through the pasting operation.

FIG. 6 is a graphical illustration of still another option, keep text only, that may be applied to a selection 652 pasted into a destination document 611. As with the prior scenarios, the selection 652 includes outline structure, general formatting, and direct formatting. As before, pasting the selection 662 into the destination document 611 caused the OOUI 612 to be displayed. However, this time, the user has chosen to match the outline format, as evidenced by the selected radio button next to that option. In response, the format selector 205, in cooperation with the outlining application 210 inserts only the text of the selection 652 from the source document 651 into the destination document 562. More specifically, any direct formatting and general formatting that existed in the source document is lost, as is any outline structure that may have existed.

By way of illustration, the text of the selection 662 (e.g., "David Tellekson" 665) is no longer shown in a Roman type font (general formatting), but rather in the native font of the destination document 611 (Courier type). Likewise, the direct formatting has been omitted (e.g., the text "David Tellekson" 665 is no longer bolded). And unlike any of the previous examples, the levels of each element of the selection 662 have been omitted. For instance, the text "David Tellekson" 665 has been changed to the level at the insertion point 515 where the selection 562 was pasted (level 2 in this example). The relative levels of the other elements in the selection 562 remain the same with respect to the new highest level. For instance, the text "Joshua Korver" 556 was at a third level in the source document 551 (i.e., I.B (i)). However, the text "Joshua Korver" 566 is inserted in the destination document 511 at the second level (i.e., 2.1) Similarly, the scheme of numbering the elements in the selection 562 has been changed from that used in the source document 551 (i.e., I.A (i)) to that used in the destination document 511 (i.e., 1.1.1).

Figure 7:
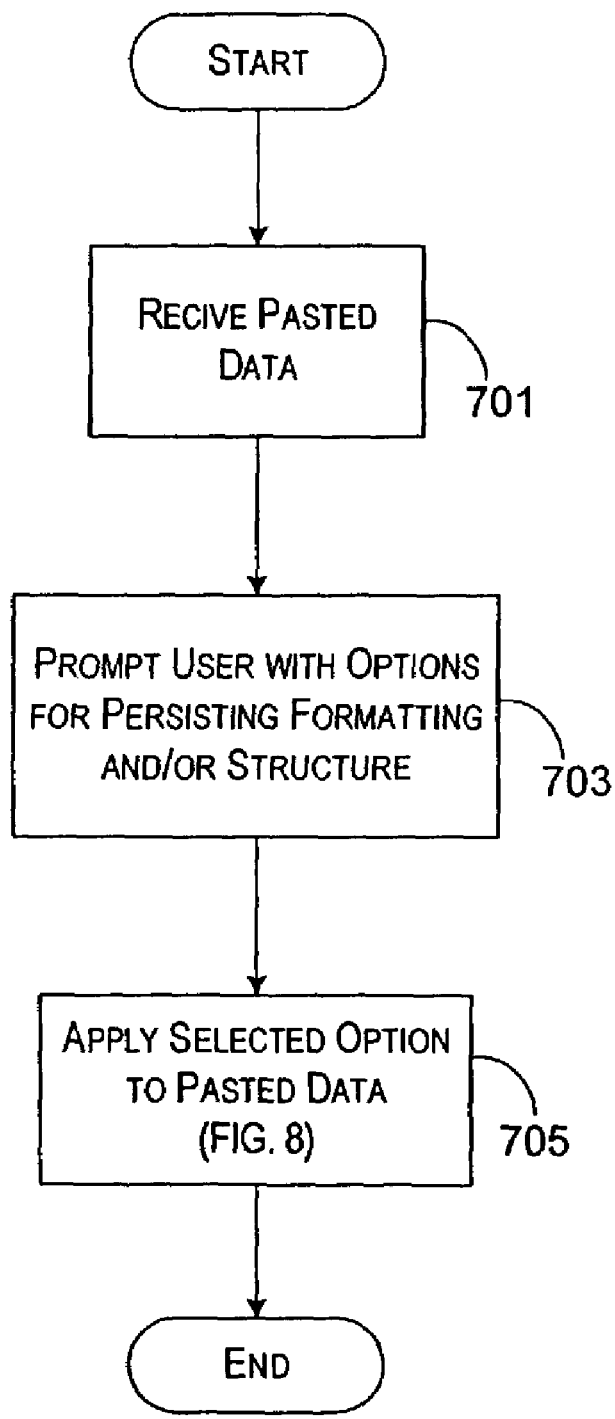
FIG. 7 is a logical flow diagram generally illustrating a process for pasting data from a source document into a destination document while providing the user with formatting and structure persistence options related to the particular data being pasted, in accordance with one implementation of the invention.

FIG. 7 is a logical flow diagram generally illustrating a process 700 for providing options for how much formatting or structure to persist during a paste operation of data from a source document into a destination document. The process enters at block 701, where copied data is pasted into an application, such as the outlining application 210 described above. The data may be pasted from a clipboard or similar component from original data in a source document. The data may include general formatting, direct formatting, outline structure, or any such combination. Once the data is received at the destination document, the process continues at block 703.

At block 703, the user is prompted with options for persisting all or a portion of the formatting and structure of the data. In one embodiment, the user is prompted through the use of an on-object-user-interface, such as the OOUI 312 shown in FIG. 3, that details the options. Each option is associated with a different set of formatting or structure to persist. If the user chooses a selection, the process continues at block 705. It should be appreciated that in one implementation, the data is pasted using a default selection, and the user is simply presented with the other optional selections.

At block 705, the selected option is applied to the pasted data. In accordance with the invention, each option is associated with different sets of formatting and/or structure that may be persisted. Thus, based on the selected option, the appropriate formatting and/or structure is applied to the pasted data in the destination document. Each of several exemplary options is illustrated in FIG. 8 and described below. However, it is envisioned that other options may also exist that will be used in alternative implementations of the invention.

FIG. 8 is a logical flow diagram illustrating in greater detail a process for applying a selected option to data pasted in a destination document. The selected option identifies what, if any, formatting and/or structure to persist from the source document. In this example, the selected option can be one of four possibilities: keep source formatting, match destination formatting, match outline format, or keep text only. Although only these three options are discussed here, other options will become apparent from the teachings of this invention. The process enters at block 803 where a selected one of these options is identified.

If keep source formatting has been selected, processing occurs at block 805, where the data is pasted and any formatting from the source document is persisted. For instance, general formatting and direct formatting are both persisted on the pasted data. In addition, any structure that existed in the source document, including the levels of the particular elements, are persisted at the levels from the source document. In essence, this option results in the pasted data appearing nearly exactly the way it did in the source document.

If match destination formatting has been selected, processing occurs at block 807, where the data is pasted and only structure and direct formatting from the source document are persisted. General formatting is lost. As with the previous option, any structure that existed in the source document, including the levels of the particular elements, are persisted at the levels from the source document. This option essentially results in the pasted data taking on the general formatting of the destination document, but any direct formatting continues to have meaning. However, the levels for each element are persisted as they were in the source document, but the bulleting or numbering scheme of the destination document may be applied.

If match outline format has been selected, processing occurs at block 809, where the data is pasted with the direct formatting from the source document. General formatting is lost. The relative structure of each element within the data is persisted from the source document. However, the levels are adjusted in accordance with the level of the insertion point at which the data is inserted in the destination document. In other words, the element having the highest relative level in the pasted data is adjusted to match the level in the destination document at the point at which the data is being pasted. The other elements then maintain their levels relative to that level. The bulleting or numbering scheme of the destination document is also applied.

If keep text only has been selected, processing occurs at block 811, where the data is pasted without persisting any formatting, either direct or general, or with any structure. This option allows the user to insert only the information and to then apply any desired formatting. It should be noted that the general formatting of the destination is typically applied to the text when it is pasted.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for pasting data from a source document into a destination document, the method comprising:

receiving data that has been copied from the source document, wherein the copied data includes applied formatting and outline structure; wherein the applied formatting includes general formatting and direct formatting that overrides at least a portion of the general formatting and wherein the outline structure assigns different levels to at least two elements that are contained within the copied data;

automatically presenting different paste options for pasting the copied data from the source document into the destination document, each different paste option being associated with a different set of formatting or outline structure to apply as a result of the paste operation; wherein the paste options allow a user to choose how much formatting and outline structure to persist from the source document when pasted into the destination document, and in response to a selection of one of the paste options, applying the set of formatting or structure associated with the selected option to the copied data and incorporating the copied data within the destination document by individually determining whether the outline structure and the applied formatting are to be applied, and individually and selectively applying the outline structure and applied formatting to the destination document in response to the determination; wherein the determination of applying the outline structure is independent of applying the applied formatting such that either outline structure is applied while ignoring the applied formatting or applied formatting is applied while ignoring the outline structure.

2. The computer-implemented method of claim 1, wherein the outline structure comprises a plurality of levels, and wherein each element in the copied data is associated with one of the plurality of levels.

3. The computer-implemented method of claim 2, wherein the outline structure further comprises at lease one parent/child relationship between two or more of the elements in the data.

4. The computer-implemented method of claim 3, wherein the parent/child relationship represents a first element at a first level and a second element at a second level, the second level being hierarchically below the first level, the second element being the child of the first element.

5. The computer-implemented method of claim 2, wherein at least one of the paste option includes persisting the outline structure from the source document.

6. The computer-implemented method of claim 5, wherein persisting the outline structure comprises each element in the copied data having the same level in the destination document as in the source document.

7. The computer-implemented method of claim 2, wherein at least one option includes modifying the outline structure from the source document.

8. The computer-implemented method of claim 7, wherein the modification to the outline structure comprises modifying a first element in the copied data such that the first element has a level associated with a position at which the data is pasted in the destination document, other elements in the copied data having the same relative levels with respect to the first element in the destination document as in the source document.

9. The computer-implemented method of claim 1, wherein the general formatting comprises general formatting that is applied to a majority of the source document.

10. The computer-implemented method of claim 9, wherein at least one of the paste options includes persisting the general formatting of the data from the source document.

11. The computer-implemented method of claim 9, wherein at least one of the paste options includes discarding the general formatting of the data from the source document.

12. The computer-implemented method of claim 9, wherein the general formatting is formatting that is applied to much of the content of the source document that is not subject to direct formatting.

13. The computer-implemented method of claim 1, wherein the direct formatting further comprises direct formatting that has been made in an active step.

14. The computer-implemented method of claim 13, wherein at least one of the paste options includes persisting the direct formatting of the data from the source document.

15. The computer-implemented method of claim 13, wherein at least one of the paste options includes discarding the direct formatting of the data from the source document.

16. The computer-implemented method of claim 13, wherein the direct formatting is formatting that is applied directly to a discrete portion of the data.

17. A computer-readable storage medium encoding with computer-executable instructions, which, when executed, perform the method of claim 1.

18. A computer-readable storage medium encoded with computer-executable instructions for pasting data from a source document into a destination document, comprising:
   accessing the data to be pasted from the source document into the destination document, wherein the data includes applied formatting, wherein the applied formatting includes general formatting and direct formatting that overrides at least a portion of the general formatting; and
   automatically displaying a paste option menu and in response to receiving an indication to persist a portion of formatting of the data to be pasted, modifying the data to be pasted in accordance with the indication before the data to be pasted is placed within the source document by individually determining whether the general formatting and the direct formatting are to be applied, and individually modifying the general formatting and the individual formatting of the destination document in response to the determination, the modification being based on a state of the data to be pasted in the source document; wherein the modifying the general formatting and individual formatting includes determining when to selectively ignore at least one of the general formatting; direct formatting and outline structure.

19. The computer-readable storage medium of claim 18, wherein the data to be pasted further includes an outline structure, and modifying the data to be pasted further comprises:
   persisting general formatting associated with the pasted data to be pasted;
   persisting direct formatting associated with the data to be pasted; and
   persisting outline structure associated with the data to be pasted.

20. The computer-readable storage medium of claim 18, wherein the data to be pasted further includes an outline structure, and modifying the data to be pasted further comprises:
   discarding general formatting associated with the data to be pasted;
   persisting direct formatting associated with the data to be pasted; and
   persisting outline structure associated with the data to be pasted data as the structure existed in the source document.

21. The computer-readable storage medium of claim 20, wherein the data to be pasted further includes an outline structure that assigns different levels to at least two elements that are contained within the data to be pasted, and a portion of outline structure persisted comprises relative levels of elements within the data to be pasted.

22. The computer-readable storage medium of claim 21, wherein the portion of outline structure persisted further comprises absolute levels of the elements within the data to be pasted.

23. The computer-readable storage medium of claim 18, wherein the data to be pasted further includes an outline structure, and modifying the data to be pasted further comprises:
   discarding general formatting associated with the data to be pasted;
   discarding direct formatting associated with the data to be pasted; and
   discarding structure associated with the data to be pasted.

24. A computer-readable storage medium having computer executable instructions encoded thereon, comprising:
   an instruction to present a first paste option for pasting copied data from a source document into a destination document that maintains source formatting of the copied data from the source document when the first paste option is selected;
   an instruction to present a second paste option for pasting the copied data from the source document into the destination document that matches destination formatting of data within the destination document when the second paste option is selected, wherein general formatting of the destination document is persisted and direct formatting of the source document is maintained;
   an instruction to present a third paste option for pasting the copied data from the source document into the destination document that maintains an outline format when the third paste option is selected, wherein general formatting of the destination document is persisted and outline formatting of the source document is maintained;
   an instruction to present a fourth paste option for pasting the copied data from the source document into the destination document that pastes the copied data as raw text when the fourth paste option is selected; and
   in response to a selection of one of the paste options, pasting the copied data according to the selected option by individually determining whether the outline structure, the direct formatting and the general formatting are to be applied, and individually and selectively applying the outline structure, the direct formatting and the general formatting to the destination document in response to the determination; wherein the determination is independent of applying any one or more of the general formatting, direct formatting and outline formatting.

25. The computer-readable storage medium of claim 24, further comprising an instruction to receive data that has been copied from the source document, wherein the copied data includes either one or both of applied formatting and outline structure, wherein the applied formatting includes general formatting and direct formatting that overrides at least a portion of the general formatting and wherein the outline structure assigns different levels to at least two elements that are contained within the copied data.

26. The computer-readable storage medium of claim 25, wherein the direct formatting comprises formatting that has been applied in an active step.

27. The computer-readable storage medium of claim 24, wherein the copied data comprises elements with each element being associated with a level, and the levels further comprising in response to a selection of one of the paste options, applying the set of formatting or structure associated with the selected option to the copied data and incorporating the copied data within the destination document.

* * * * *

UNITED STATES PATENT AND TRADEMARK OFFICE
CERTIFICATE OF CORRECTION

| | | |
|---|---|---|
| PATENT NO. | : 7,480,861 B2 | |
| APPLICATION NO. | : 10/268151 | |
| DATED | : January 20, 2009 | |
| INVENTOR(S) | : Mark Yalovsky et al. | |

It is certified that error appears in the above-identified patent and that said Letters Patent is hereby corrected as shown below:

In column 10, line 26, in Claim 3, after "in the" insert -- copied --.

In column 10, line 35, in Claim 5, delete "option" and insert -- options --, therefor.

In column 10, line 42, in Claim 7, delete "option" and insert -- of the paste options --, therefor.

In column 10, line 47, in Claim 8, after "position at which the" insert -- copied --.

In column 10, line 52, in Claim 9, after "formatting comprises" delete "general".

In column 10, line 56, in Claim 10, after "formatting of the" insert -- copied --.

In column 10, line 60, in Claim 11, after "formatting of the" insert -- copied --.

In column 10, line 63, in Claim 12, after "is applied to" delete "much of".

In column 10, line 66, in Claim 13, after "formatting" delete "further".

In column 10, line 66, in Claim 13, after "comprises" delete "direct".

In column 11, line 3, in Claim 14, after "formatting of the" insert -- copied --.

In column 11, line 6, in Claim 15, after "formatting of the" insert -- copied --.

In column 11, line 9, in Claim 16, after "portion of the" insert -- copied --.

In column 11, line 10, in Claim 17, delete "encoding" and insert -- encoded --, therefor.

Signed and Sealed this
Third Day of May, 2011

David J. Kappos
*Director of the United States Patent and Trademark Office*

CERTIFICATE OF CORRECTION (continued)
U.S. Pat. No. 7,480,861 B2

In column 11, line 14, in Claim 18, after "instructions for" insert -- displaying pasting options for --.

In column 11, line 40, in Claim 19, after "associated with the" delete "pasted".

In column 11, line 55, in Claim 20, after "pasted" delete "data".

In column 12, line 9, in Claim 23, after "discarding" insert -- outline --.